United States Patent [19]

Leiber et al.

[11] Patent Number: 4,850,446

[45] Date of Patent: Jul. 25, 1989

[54] MOTOR VEHICLE PROPULSION CONTROL WHEN ACCELERATING FROM A STATIONARY POSITION

[75] Inventors: Heinz Leiber, Oberriexingen; Hans-Joachim Ohnemüller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 237,323

[22] Filed: Aug. 29, 1988

[30] Foreign Application Priority Data

Aug. 27, 1987 [DE] Fed. Rep. of Germany ....... 3728572

[51] Int. Cl.$^4$ .............................................. B60K 31/00
[52] U.S. Cl. ................................... 180/197; 123/361; 364/426.03
[58] Field of Search ................ 180/197; 123/351, 361; 364/426.03

[56] References Cited

U.S. PATENT DOCUMENTS 4,785,904 11/1988 Leiber et al. .................... 180/197

FOREIGN PATENT DOCUMENTS 0229249 11/1986 European Pat. Off. .

Primary Examiner—John A. Pekar
Attorney, Agent, or Firm—Barnes & Thornburg

[57] ABSTRACT

In a system for controlling the propulsion on motor vehicles, by a reduction of the drive torque by an intervention in ignition, carburator or fuel injection and/or brakes, includes a first device which reduces the drive torque when the maximum adhesion coefficient is exceeded, and a second device which reduces the drive torque to a value associated with the measured maximum value of the vehicle acceleration when the monitored wheel variable exceeds the threshold value, as a result of which too great an excess of torque is prevented and sufficient traction and cornering stability are retained without unnecessarily slowing down a propulsion of the motor vehicle.

10 Claims, 2 Drawing Sheets

MOTOR VEHICLE PROPULSION CONTROL WHEN ACCELERATING FROM A STATIONARY POSITION

BACKGROUND AND SUMMARY OF THE INVENTION

The invention relates to a system for controlling the propulsion on motor vehicles as described in copending U.S. patent application Ser. No. 136,931 filed Dec. 23, 1978, which issued as U.S. Pat No. 4,785,904.

In this known system, a reduction of the drive torque is effected when the slip of at least one driven vehicle wheel exceeds a preset threshold value. As soon as the wheel tending to spin no longer accelerates, the torque is increased to a value calculated from various input variables.

The process for detecting wheel slip of a vehicle with all wheel drive is known from EPO No. 229,249A1, in which the slip values of the individual driven wheels are determined from the calculated angular speed change and the comparison of the calculated angular speed change with the values actually measured. The calculation of the angular speed change to be expected on the basis or the load requirement is made by specific data, inter alia, stored in an engine characteristic graph.

Control signals such as wheel slip or wheel acceleration derived from wheel speed sensors are insufficient for optimum control, in particular when starting to move. The dynamics of the wheels is not in phase with the dynamics of the engine, and utilizable control signals arise only above a certain wheel circumferential speed of approximately 3 km/h.

Related to a control signal obtained from a wheel sensor, the engine has a delayed reaction to an adjustment of the throttle valve or an adjustment of the fuel injection amount, in particular when the drive torque is increased.

With a rapid increase in speed, it is difficult to correct the excess torque generated at the driven wheel. Especially when accelerating from a stationary position, a great excess of torque often arises very quickly before utilizable wheel speed signals are present. This is undesirable, since the traction is considerably reduced, for example in the case of low adhesion coefficients.

Control signals used for known systems arise when preset slip or acceleration limits are exceeded and are determined with the aid of wheel speed sensors.

It is the object of the invention to improve known systems for propulsion control such that in particular when accelerating from a stationary position, it is possible for the control to begin at an early point and prevent an excess of torque.

This object is achieved according to the invention by the following features. According to this, a control signal is generated by a first device if, when the engine speed is increasing, the vehicle longitudinal acceleration, measured by a sensor arranged on the vehicle, does not increase, that is to say remains constant or decreases.

In this manner, the range of the maximum adhesion coefficient is attained. In particular in the case of a smooth roadway, this state can already be established long before a utilizable signal is available from the wheel speed sensors and this signal exceeds a preset threshold value. This time span gained can be used for cutting off the drive torque early, which results in considerably less excess torque, which can then be controlled well.

Further, the control signal of the first device, depending on the engine type used (Otto engine with carburetor or fuel injection or diesel engine), is used for at most the preset time span or, as long as the engine speed does not again fall below values stored at the moment the interruption began, to interrupt the ignition (in the case of an Otto engine) or the fuel injection system (in the case of an Otto or diesel engine). Subsequently, or after the appearance of a control signal derived from the speed sensors (exceeding a slip or acceleration threshold), the control signal is used to set the ignition or the throttle valve or the fuel injection system to the value which is associated with the measured (maximum) value of the vehicle longitudinal acceleration or, a slightly lower value.

Other objects, advantages and novel features of the present invention will become apparent from the following detailed description of the invention when considered in conjunction with the accompanying drawings.

DETAILED DESCRIPTION OF THE DRAWINGS

The exemplary embodiment described below refers to a motor vehicle with Otto engine and carburetor or injection with rear wheel drive. FIG. 1 shows the signals of interest shortly after starting to to accelerate from a stationary position and a first control cycle.

Figure 1A:
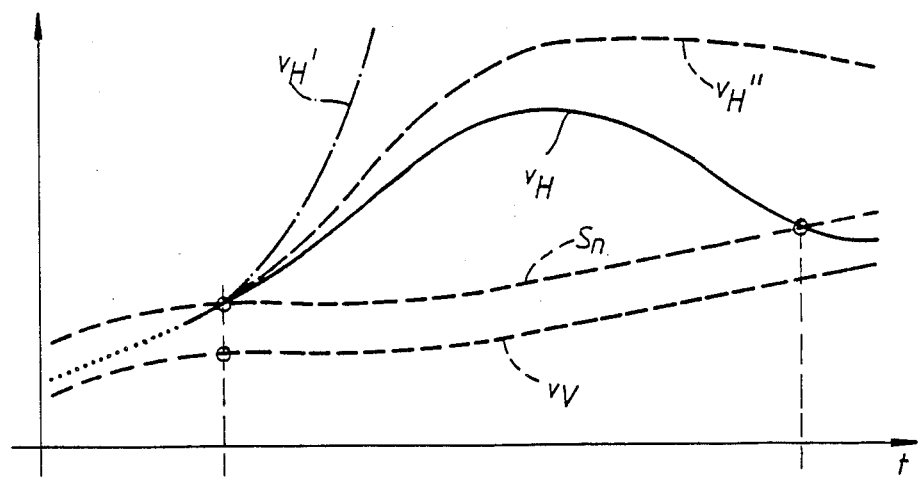
FIGS. 1a to 1d show curves of vehicle signals, wheel signals and control signals of ignition angle and throttle angle respectively as a function of time.

FIG. 1a shows, as a function of time t, in dashed lines the velocity $v_v$ of a non-driven front wheel and a slip threshold $S_n$ derived therefrom. The solid line represents the velocity $v_h$ of a driven rear wheel, which exceeds the slip threshold $S_n$ at instant $t_2$. This line is shown dotted until shortly before $t_2$ to indicate that a utilizable sensor signal is only available shortly before $t_2$.

Figure 1B:
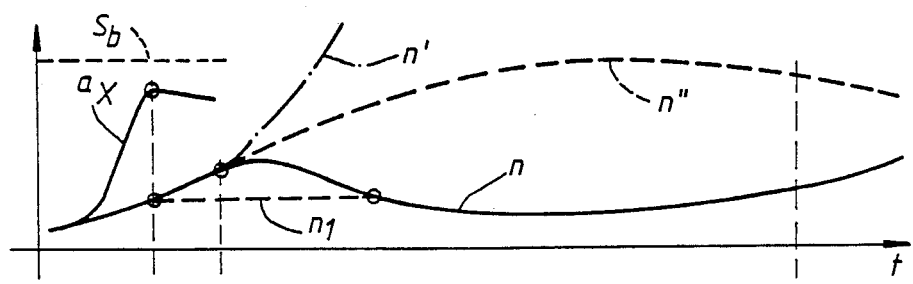

FIG. 1b shows, on the same time scale t, the curve of the vehicle longitudinal acceleration $a_x$ and the engine speed n.

Figure 1C:
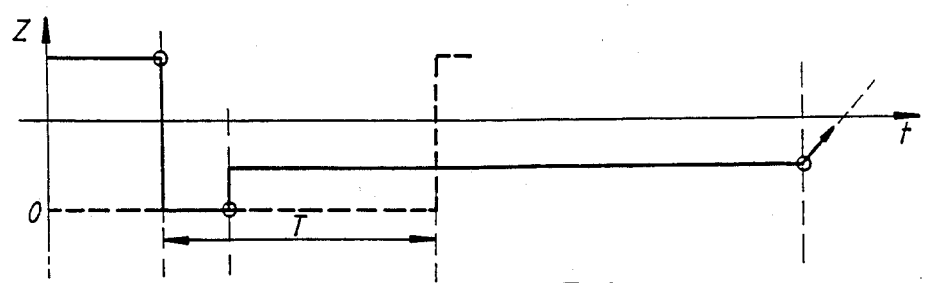

FIG. 1c shows the curve of the ignition angle Z.

Figure 1D:
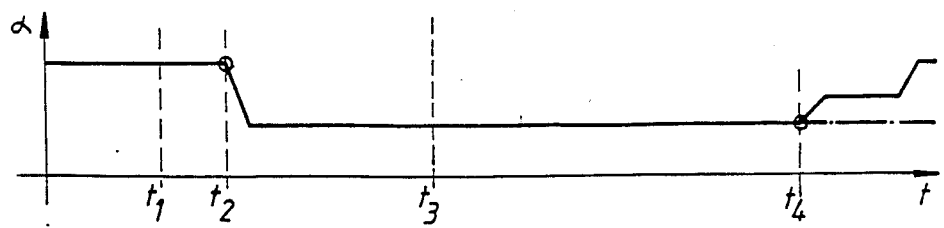

FIG. 1d shows the curve of the throttle valve angle $\alpha$ of the carburetor.

Figure 2:
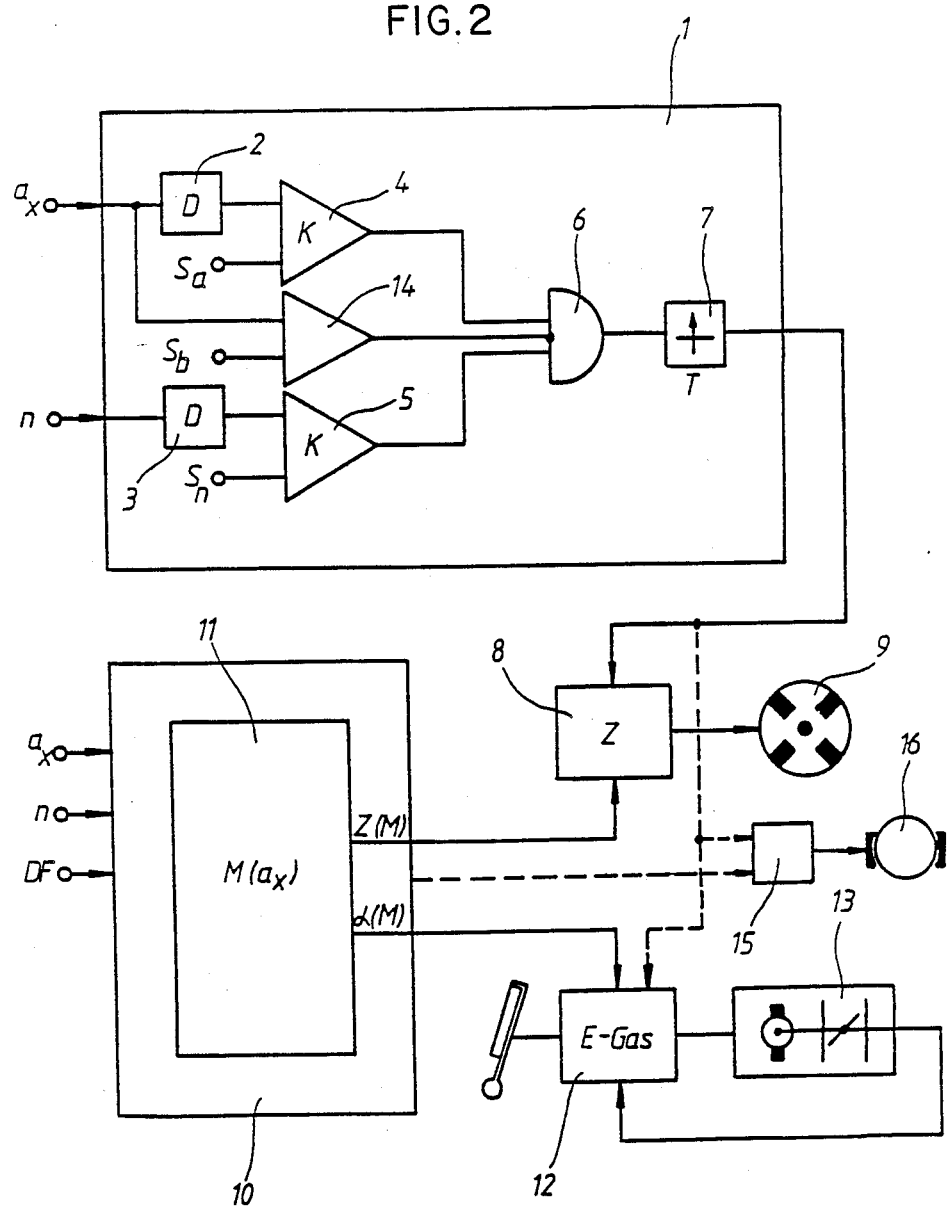
FIG. 2 is a schematic circuit diagram of a system according to the present invention.

The diagrams of FIG. 1 will be described in more detail after describing the device according to FIG. 2.

A signal representing the vehicle longitudinal acceleration $a_x$ and a signal for the engine speed n are supplied to a first device 1. Both signals are routed in each case via a differentiator 2 and 3 and each supplied to a comparator K. In the comparator 4, the differentiated vehicle longitudinal acceleration $a_x$, that is to say its increase, is compared with a nominal value $S_a$. The comparator 4 outputs an output signal if the increase is not positive, that is to say equal or less than zero. Analogously, the increase of the speed signal is compared in the comparator 5 with a nominal value $S_n$ and an output signal is generated as long as the increase is positive or greater than zero.

Both output signals of the comparators 4 and 5 are supplied as input signals to an AND gate 6 which accordingly generates an output signal if the longitudinal acceleration $a_x$ does not rise when the engine speed is increasing.

The output signal of the AND gate 6 should only appear, however, in this exemplary embodiment, under these conditions as long as the vehicle acceleration lies below a present threshold value $S_b$ as indicated in FIG. 1b by a dashed line. This is achieved by the fact that a comparator 14 is provided additionally in the first device 1, which comparator compares the vehicle longitudinal acceleration $a_x$ with a present threshold value $S_b$, for example 0.1 g. If this threshold value is exceeded, the comparator 14 then outputs a signal to an inverting input of the AND gate 6, whereby the AND gate 6 is locked or disabled. Greater vehicle acceleration means greater traction, in which case an early intervention appears to be unnecessary.

Via a timing element 7, which is set to a preset time T, the output signal of the AND gate 6 is restricted to this preset time T. Alternatively, the speed can be used as a reference point. If, for example, the current speed $n_1$ is stored at instant $t_1$, then the ignition intervention can be switched off again when the speed decreasing after the intervention again reaches or falls below the reference level $n_1$. This alternative is indicated in FIG. 1b by the dashed straight line $n_1$. The timing element 7 can also be designed such that it effects a switch-on delay instead of or in addition to the preset time limit. This permits avoidance of too great a filtering of the acceleration signal $a_x$ and permits prevention of a reaction to high frequency signal peaks The output signal of the timing element 7 is supplied to ignition electronics, indicated by a box 8, with ignition distributor 9, symbolically represented, and to an electronic accelerator pedal control 12.

A box 10 contains a propulsion control system known per se, for example microprocessor 30 in the copending U.S. patent application Ser. No. 136,931 which issued as U.S. Pat. No. 4,785,904 and is incorporated by reference herein. The signals DF of the wheel speed sensors, signals for the vehicle longitudinal acceleration $a_x$ and the engine speed n are supplied to this propulsion control system.

Within the propulsion control system 10, a second device 11 is arranged which determines from the supplied, and if necessary further input signals, in a manner known, the value for the engine output torque $M(a_x)$ which is required for a vehicle longitudinal acceleration $a_x$. The vehicle longitudinal acceleration $a_x$ is measured at instant $t_1$ (in FIG. 1b), which is the instant when this longitudinal acceleration reaches a horizontal tangent, or in which an output signal of the comparator 4 begins. To this value of the drive torque (in a manner known via engine characteristic graph, engine speed and transmission ratio) values for ignition angle $Z(M)$ and throttle valve (M), matched to each other, are assigned. These values $Z(M)$ and (M) are outputted at instant $t_2$ (FIGS. 1c and 1d) to the ignition electronics 8 and the electronic acceleration pedal control 12, which acts upon the engine-activated throttle valve 13 of the carburetor. Alternatively or additionally, it is also possible to act upon the brakes 16 of the driven wheel(s), as indicated, via a gate 15.

The function of the system according to the invention is as follows.

If the vehicle moves off with a powerful application of the accelerator pedal, then first the wheels turn and the vehicle accelerates. It is only possible here to evaluate wheel speeds of more than, for example, 3 km/h. Where the torque is too great or the roadway is smooth, the driven wheels or the engine speed would follow the curve shown with a dashed line in FIGS. 1a and 1b, $v_H'$ or n', and spin. Previously however, at instant $t_1$, the vehicle acceleration $a_x$ (FIG. 1b) already reached a maximum, that is to say the range of the maximum adhesion coefficient is reached although the engine speed n continues to rise. At this moment, an intervention already takes place, since the acceleration threshold $S_b$ is not exceeded, in that the ignition is interrupted (FIG. 1c, represented by the value 0 on the ordinate). This interruption of the ignition, which can also begin late and react very quickly to that of the engine, would be maintained at most for the duration T, approximately 20-40 ms, until instant $t_3$ or until the engine speed n has again fallen below the stored value $n_1$, if until then a driven wheel had not exceeded the present threshold value $S_n$, for example a specific wheel slip.

At instant $t_2$, the driven wheel exceeds the slip threshold values and the ignition is adjusted, by means of an engine characteristic graph (not shown), to a value $Z(M)$ associated with the drive torque or the vehicle acceleration $a_x$ at the instant $t_1$ and the throttle valve angle is adjusted to a valve (M) likewise associated with this torque or this acceleration. Value $Z(M)$ of the ignition angle is usually a value with late ignition, which is represented in FIG. 1c by a value beneath the time axis which is intended to correspond to an ignition in the dead center. Values above the time axis represent early ignition before the top dead center of the piston in the cylinders is reached.

If the ignition was not cut off at instant $t_1$, then a considerably greater excess torque would arise, which would result in a curve, represented in FIGS. 1a and 1b by a dashed line, of the speed $v_H''$ of a driven wheel or the engine speed n", which would considerably postpone the value falling below the slip threshold. However, as a result of the early intervention, the value $v_H$ already falls below the threshold value $S_n$ at instant $t_4$, and consequently ignition and throttle valve can be blocked again in a known manner until the threshold value is exceeded again or the values preset by the accelerator pedal are reached again.

An alternative is that the values $Z(M)$ and $\alpha(M)$ are not assigned to the torque $M(a_x)$, but to a lesser value, in order to obtain not too great an excess torque in the next control cycles.

The fuel injection quantity can be substituted as the adjustment variable instead of the throttle valve in the case of injection Otto engines, and instead of the ignition in the case of diesel engines.

If no control signal is made, as assumed at $t_2$, within the preset time T or until the value falls below $n_1$, a renewed comparison of the vehicle acceleration $a_x$ and engine speed n is made after switching on the ignition again with consequent increasing speed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. System for controlling the propulsion on motor vehicles to prevent the undesirable spinning of the driven vehicle wheels, having at least one threshold value indicator associated with each driven vehicle wheel and monitoring the slip or acceleration of the respective wheel, having means to determine vehicle longitudinal acceleration, and having a control means activated by the output signals of said threshold value indicator for reducing the drive torque by an intervention in one or more of the following ignition, carburetor, fuel injection, and brakes, comprising:

first storage means for determining and storing engine speed at moment of intervention; and means for initiating an intervention of one or more of the following: interrupting the ignition or reducing the fuel supply as soon as the vehicle longitudinal acceleration does not increase while the engine speed is rising, and maintains said intervention until a preset period has expired or until the engine speed reaches or falls below said value stored in said first storage means at the moment of intervention.

2. System according to claim 1, including:

second means for presetting values for the ignition angle and the throttle valve angle or the fuel injection quantity associated with this non-increasing value of the vehicle longitudinal acceleration;

second storage means in said second means for storing an engine characteristic graph which associates said values of ignition angle, throttle value angle or fuel injection quantity with a drive torque producing this longitudinal acceleration, and said first means includes logic means for adjusting the ignition or the throttle valve or the fuel injection system to said values, as soon as and as long as a control signal of the propulsion control system is present, and the interruption or reduction of the ignition or the fuel supply is ended at the end of a preset period running from the beginning of the interruption or when the engine speed reaches again or falls below the value stored at the moment when the interruption or reduction began, before a control signal of the propulsion control system is present.

3. System according to claim 2, wherein the second means presets values which are associated with a value reduced by a specific amount or by a percentage portion, of the drive torque, which corresponds to the value of the non-increasing vehicle longitudinal acceleration.

4. System according to claim 2, wherein for Otto engines, said second storage means includes an engine characteristic graph which match to each other the values, preset by the second means, for ignition angle and throttle valve angle or fuel injection quantity.

5. System according to claim 1, wherein said first means includes input means for receiving signals for the engine speed and the vehicle longitudinal acceleration;

differentiating means for differentiating said engine speed and vehicle longitudinal acceleration signal;

first comparator means for outputting an output signal when an input signal representing the differentiated vehicle longitudinal acceleration is not positive;

second comparator means for outputting an output signal when an input signal representing the differentiated engine speed is positive;

AND means for outputting an output signal when the two output signals of the first and second comparator means are present, and timing means responsive to the output signals of the AND means for initiating an intervention for a present period.

6. System according to claim 5, including delay means for delaying the output signal of the AND means for a preset delay time.

7. System according to claim 5, including means for locking the AND as the vehicle longitudinal acceleration exceeds a preset threshold value.

8. System according to claim 1, wherein said first means initiates an intervention of wheel brakes.

9. System according to claim 8, wherein said second means presets the ignition, throttle valve or fuel injection system or wheel brakes in response to intervention by said first means.

10. System according to claim 8, wherein said second means presets the ignition, throttle valve or fuel injection system or wheel brakes when the monitored slip or acceleration of a wheel exceeds the threshold value.

* * * * *